(12) United States Patent
Leung

(10) Patent No.: US 8,416,064 B2
(45) Date of Patent: Apr. 9, 2013

(54) UNIVERSAL MOBILE COMMUNICATION SYSTEM FOR WIRELESS AND WIRE LINE SENSOR NETWORK

(76) Inventor: Yiu Fung Leung, Hong Kong (CN)

( * ) Notice: Subject to any disclaimer, the term of this patent is extended or adjusted under 35 U.S.C. 154(b) by 239 days.

(21) Appl. No.: 12/804,669

(22) Filed: Jul. 27, 2010

(65) Prior Publication Data

US 2011/0133908 A1  Jun. 9, 2011

(30) Foreign Application Priority Data

Dec. 7, 2009  (CN) .......................... 2009 1 0254101

(51) Int. Cl.
*G08B 9/00* (2006.01)

(52) U.S. Cl. ........... 340/286.02; 340/932.2; 340/426.18; 705/28; 705/32

(58) Field of Classification Search ............... 340/573.1, 340/540, 539.11, 992, 989, 670, 686.1; 482/54, 482/8; 705/28, 32
See application file for complete search history.

(56) References Cited

U.S. PATENT DOCUMENTS

| | | | |
|---|---|---|---|
| 6,340,935 B1* | 1/2002 | Hall | 340/932.2 |
| 7,443,286 B2* | 10/2008 | Nakane et al. | 340/426.18 |
| 7,551,064 B2* | 6/2009 | Pudelko et al. | 340/426.1 |
| 7,783,530 B2* | 8/2010 | Slemmer et al. | 705/28 |
| 7,893,848 B2* | 2/2011 | Chew | 340/932.2 |
| 7,961,095 B2* | 6/2011 | George et al. | 340/541 |
| 2002/0109610 A1* | 8/2002 | Katz | 340/932.2 |
| 2005/0270178 A1* | 12/2005 | Ioli | 340/932.2 |
| 2006/0098238 A1* | 5/2006 | Ylonen | 358/402 |
| 2006/0273879 A1* | 12/2006 | Pudelko et al. | 340/5.72 |
| 2006/0287816 A1* | 12/2006 | Bardsley et al. | 701/209 |
| 2007/0061192 A1* | 3/2007 | Chew | 705/13 |
| 2007/0103300 A1* | 5/2007 | Peng | 340/571 |
| 2007/0222640 A1* | 9/2007 | Guelzow et al. | 340/908 |
| 2008/0026803 A1* | 1/2008 | Demuynck | 455/575.1 |
| 2008/0042810 A1* | 2/2008 | Nakane et al. | 340/426.18 |
| 2008/0073192 A1* | 3/2008 | Lee | 200/333 |
| 2008/0150731 A1* | 6/2008 | Laukkanen et al. | 340/573.1 |
| 2008/0220824 A1* | 9/2008 | Miyoshi et al. | 455/567 |
| 2009/0309760 A1* | 12/2009 | Chew | 340/932.2 |
| 2010/0045796 A1* | 2/2010 | Fraley et al. | 348/143 |
| 2010/0164699 A1* | 7/2010 | Mohapatra | 340/426.13 |
| 2010/0164719 A1* | 7/2010 | George et al. | 340/541 |
| 2010/0274693 A1* | 10/2010 | Bause et al. | 705/32 |
| 2011/0032098 A1* | 2/2011 | Yang | 340/540 |
| 2011/0046826 A1* | 2/2011 | Carroll | 701/19 |
| 2011/0140922 A1* | 6/2011 | Levy et al. | 340/932.2 |
| 2012/0126959 A1* | 5/2012 | Zarrabi et al. | 340/407.1 |

* cited by examiner

*Primary Examiner* — Hoi Lau
(74) *Attorney, Agent, or Firm* — Sonya C. Harris; Invention Services GAFF Myer IPS

(57) ABSTRACT

A universal mobile communication system for wireless and wired sensor networking. The system is based on a sensor network comprising both hardware (wireless and/or wire-line sensor nodes) and software (universal mobile communication system logic, communication portal, etc.). The system of the instant invention may also comprise mobile communications devices (MCD), and in certain embodiments, the universal mobile communication system for wireless and wire lined sensor networking may comprise: a MCD; a set sensor node; a backend server; a short messaging service (SMS) server; and a communication portal. The MCD may connect to the sensor node by wireless communication and the backend server can couple all of the components in the system by communication such that information provided by the MCD and the fixed sensor node is sent to the backend server and transferred to the communication portal through the backend server while information from the communication portal is sent to the backend server and transferred to the MCD and the fixed sensor node.

3 Claims, 9 Drawing Sheets

UNIVERSAL MOBILE COMMUNICATION SYSTEM FOR WIRELESS AND WIRE LINE SENSOR NETWORK

FIELD OF THE INVENTION

The present invention relates to a communication system, in particular to a universal mobile communication system.

BACKGROUND OF THE INVENTION

Presently, the mobile phone networking systems tend to increase their communication bandwidth continuously, for example, the 3G and 4G mobile phone network. The providers of mobile phone service/content tend to increase the size of data/service such as video-on-demand and video-conferencing in order to fully utilize the abundant bandwidth provided by the mobile phone networking system, and the manufacturers of the mobile phones tend to increase the computation power of the mobile phones in order to decode the bandwidth-hungry content provided by the providers.

In most situations, however, a user 10 may only require a small amount of information, thus more cost-effective and low data-rate communication is sufficient. In the event that the user 10 enters a particular location, such as a shop or a restaurant which is located within a larger establishment, such as a shopping-mall, a hotel, or a car parking facility, the required data-rate bandwidth for information retrieval may be substantially reduced, and a sensor network 800 may be well-suited for this kind of application.

SUMMARY OF THE INVENTION

With regard to the instant invention, described hereinafter is a universal mobile communication system providing useful and immediately required instant-information and alerts to the users.

The system is based on a sensor network comprising both hardware (wireless and/or wire-line sensor nodes, MCD's, etc.) and software (universal mobile communication system logic, communication portal, etc.). It is noted that the sensor nodes may be either wireless and/or line-wired and the use of the term "sensor node(s)" throughout this disclosure, hereinafter, is intended to include both connection instances. Furthermore, since the term "set" denotes one or more, the use of the term "set of sensor nodes", shall include the meaning of one or more sensor nodes.

The system of the instant invention may also comprise mobile communications. If the MCD is within the coverage area of the sensor network, information will be downloaded to a user's MCD directly. If not, the information will be sent to the user's mobile phone whose number is bound to the MCD. Each of the specific potential applications is listed as follows.

In certain embodiments of the present invention, the universal mobile communication system for wireless and wire lined sensor networking may comprise:

a MCD;
a set sensor node;
a backend server;
a short messaging service (SMS) server; and
a communication portal.

The MCD may connect to the sensor node by wireless communication and the backend server can couple all of the components in the system by communication such that information provided by the MCD and the fixed sensor node is sent to the backend server and transferred to the communication portal through the backend server while information from the communication portal is sent to the backend server and transferred to the MCD and the fixed sensor node.

In another instance, if the MCD is in the wireless coverage area of the fixed sensor node, information provided to the MCD by all the other components in the system may be sent to the MCD by the fixed sensor node. And, if the MCD is outside of the wireless coverage area of the fixed sensor node, information may be provided to the MCD by all the other components in the system and texted to a mobile phone whose number is bound to the MCD by the SMS server.

The system may also comprise a Mobile Kiosk 300 which is operatively coupled to the MCD 1000, the fixed sensor node, and the backend server. The Mobile Kiosk 300 may further include a vibration sensor for monitoring the location situation.

The system may also comprise a Mobile Display 200 which may be operatively coupled to the MCD, the fixed sensor node and the backend server. The Mobile Display 200 may further include a vibration sensor for monitoring the location situation.

The system may also comprise a mobile administration device which may be operatively coupled to the fixed sensor node and the backend server. The mobile administration device may further include a vibration sensor for monitoring the location situation.

The system may also comprise a mobile wireless sensor node input device which may be operatively coupled to the MCD, the fixed sensor node and the backend server.

The MCD may comprise a master-body and a slave body which can be coupled to the master-body through wireless communication. If the master-body and the slave-body are coupled together as a single device, the slave-body is idle; and, if the slave-body is detached from the master-body, the slave-body is active.

The master-body and/or the slave body may comprise a vibration sensor for monitoring the movement of a user of the MCD, and one master body may connect with multiple slave body devices.

The master body and/or the slave-body may comprise a pedometer for monitoring the step profile of a user of the MCD.

The fixed sensor node may comprise a vibration sensor for monitoring the location situation.

In a car park application of the system, the fixed sensor node is set in a vehicle parking lot environment. The MCD may be located in or on a vehicle or it may be held by the user, or operator of a vehicle. When the vehicle enters the parking lot, the fixed sensor node communicates with, and records the MCD information, and after the vehicle is parked, the user may press an input key, or button on the MCD to send a message to, and receive a reply from the fixed sensor node for registration.

After the registration, the user 10 may press a button on the MCD to enable an anti-theft mode and tell the fixed sensor node to monitor the vehicle and the MCD 1000 so that once an abnormal situation is detected, the fixed sensor node may alert the backend server. If the MCD is within the wireless coverage area of the fixed sensor node, the backend server may deliver an alert to the MCD through the fixed sensor node. Moreover, if the MCD is out of the wireless coverage area of the fixed sensor node, then the backend server may provide an alert via texting to a mobile phone whose number is bound to the MCD 1000 by the short messaging service (SMS) server.

Therefore, by applying the system of the instant invention, many of the clients, customers, tenants, web data providers, management companies, landlords, etc. would be benefited in terms of convenience, turnover enhancement, crowd enhancement, operation efficiency, and beyond.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

The novel features which are characteristic of the invention, as to organization and method of operation, together with further objects and advantages thereof, will be better understood from the following disclosure considered in connection with the accompanying drawings in which one or more preferred embodiments of the invention are illustrated by way of example. It is to be expressly understood, however, that the drawings are for the purpose of illustration and description only and are not intended as a definition of the limits of the invention.

It is to be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods and procedures described herein. Additionally, any signal arrows in the drawings/Figures should be considered only as exemplary, and not limiting, unless otherwise specifically noted. Furthermore, any use of the term "or" as used herein is generally intended to mean "and/or" unless otherwise indicated. Combinations of components or steps will also be considered as being noted, where terminology is foreseen as rendering the ability to separate or combine is unclear.

DETAILED DESCRIPTION OF THE DRAWINGS

Figure 1:
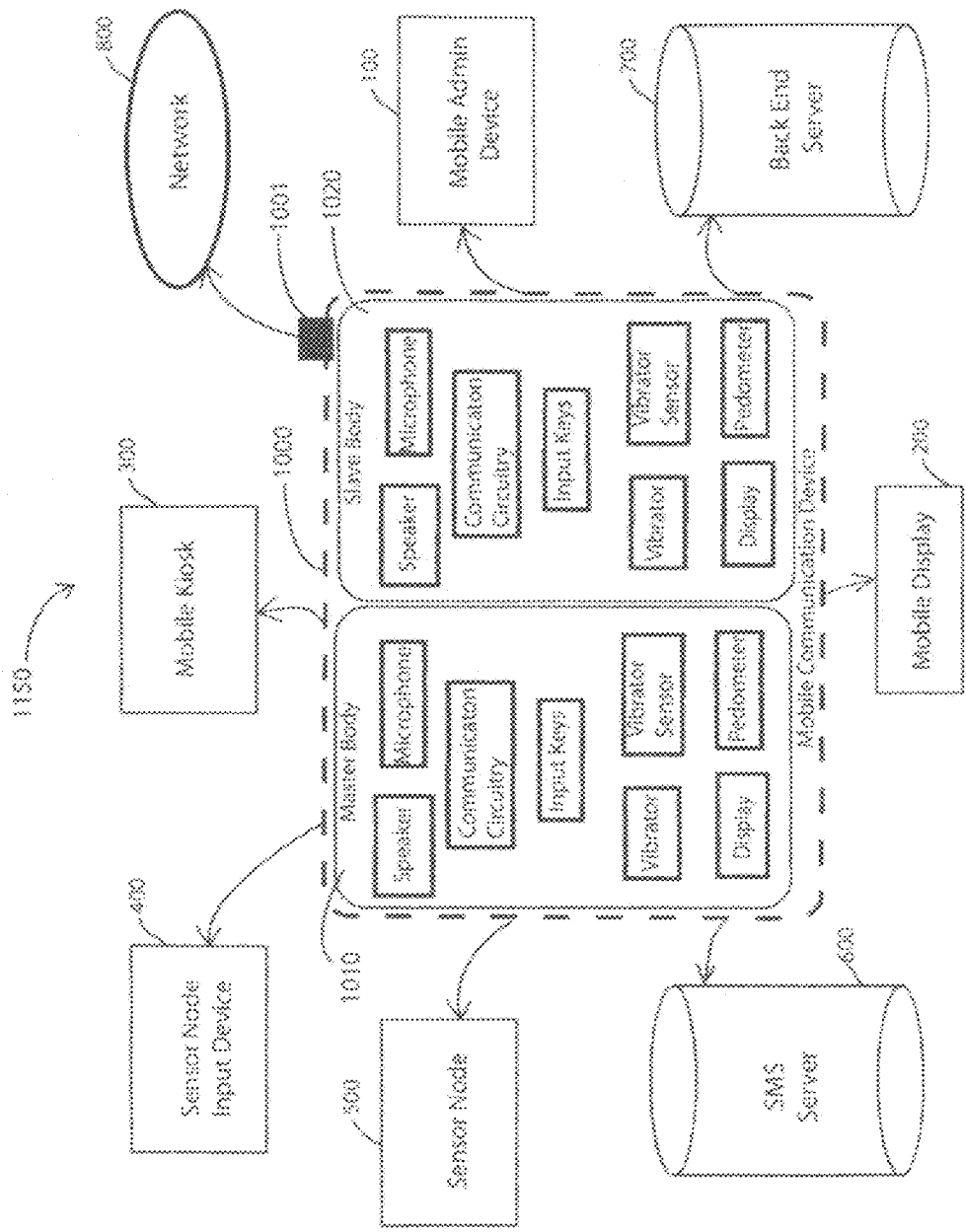
FIG. 1 illustrates a systems block diagram of the components of the Universal Mobile Communication System, in accordance with one embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where an indefinite or definite article is used when referring to a singular noun, e.g. "a", "an", "the", this includes a plural of that noun unless something else is specifically stated.

FIG. 1 illustrates a systems block diagram of The Universal Mobile Communication System (UMCS) 1150. The UMCS 1150 is based on either wireless and/or wired sensor networking and comprises a Mobile Communication Device (MCD) 1000, a fixed sensor node 500 (indoor and/or outdoor), a mobile wireless sensor node input device 400, a Mobile Kiosk 300, a Mobile Display 200, a mobile administration device 100, a backend server 700, a short messaging service (SMS) server 600 and a communication portal 1001. The applications of the present system are numerous and only certain embodiments are enumerated as follows via the structure, function, operation, and interaction of the components of the UMCS 1150 as further hereinafter described.

The MCD 1000 is a wireless mobile communications device which may comprise a master-body 1010 and a slave-body 1020 communication circuitry, which depending upon various situations, may comprise more than one slave-body device coupled to the same master-body. The master-body 1010 is a wireless device, which depending on different situations, may comprise a display, a set input keys (or buttons), a pedometer, a vibration sensor, a vibrator, a loudspeaker and/or buzzer, some LEDs, a microphone, a USB port, a communication port, a Wi-Fi circuit, and a Bluetooth circuit. The slave-body 1020 is a waterproof wireless device which may likewise comprise the same listing of components as the master-body.

In embodiments employing outdoor applications, the master-body 1010 and the slave-body 1020 may connect together as a single device and the slave-body 1020 is idle. And under some other applications, once it is detached from the master-body, the slave-body 1020 may be active and communicate with the master-body 1010 through wireless transmissions. A better understanding of the functions of the master-body 1010 and the slave-body 1020 may be gleaned from the following description.

The master-body 1010 and the slave-body 1020 each comprise a set of components as listed:

The display is for showing instant information such as ready-alerts, security-alerts, daily-alerts, service-requests, battery-level of the MCD 1000, and signal-level of the sensor network.

The input keys are for initiating selected or required instant-information, service-requests, and the like, and operating in an alarm state (such as panic-alarm, service-bell, etc.).

The pedometer is for sensing and/or recording the step profile of the user 10 (e.g., number of steps, step amplitude, step frequency/period, step regularity, etc.). This function may work as a stand alone product feature and also may operate normally and independently when the MCD 1000 is out of the transmission coverage area of the sensor network 800, and/or when the MCD 1000 itself is offline, i.e. not operatively coupled to internet through a PC or some other networking devices.

The vibration sensor is for sensing/recording the movement patterns of the user 10. This function may work as a stand alone feature/product and operate normally and independently when the MCD 1000 is out of the coverage area of the sensor network 800 or when offline.

The vibrator and loudspeaker are for alerting the user 10 to new instant-information and/or alerts (e.g., ready-alerts, security-alerts, daily-alerts, service-requests, etc.).

When the MCD 1000 is out of the coverage area of the sensor network 800 or offline and the slave-body 1020 is detached from the master-body 1010, the slave-body 1020 may continuously send the sensed vibration or movement data, button status data, etc. to the master-body 1010 through wireless communication. Under this sort of sensor networking configuration, many applications may be supported. For example:

(1) anti-property-theft application, e.g. after activating the anti-theft feature, the slave-body 1020 (which is attached to the property to be protected) may send an anti-property theft security-alert to the master-body 1010 to alert the user 10 (who is in possession of the master-body 1010) that the property being protected is under abnormal movement and requires more attention to keep the property safe;

(2) movement-habit and/or voice-pattern recognition application, e.g. the user 10 may register the movement-habit and/or voice-pattern to the MCD 1000, afterwards once the registered movement-habit and/or voice-pattern occurs, the MCD 1000 may send an alert to the user 10 or other personnel through the MCD 1000, SMS, mobile phone, etc.; and (3) other kinds of remote sensing/control depending on applications. All the aforesaid features may work as a stand alone feature/product and operate normally and independently when the MCD 1000 is out of the coverage area of the sensor network 800 or is offline.

The MCD 1000 may record the transaction data of the user 10, e.g. shopping records, car/vehicle parking duration, parking lot-number, bonuses or specials, access-rights, e-ticket, e-coupon, and the food that the user 10 takes in the restaurant, etc.

The MCD 1000 may record the output of the pedometer and vibration sensor of the user 10. When the master-body 1010 is within the coverage area of the sensor network 800 or is online and the slave-body 1020 is detached from the master-body 1010, the slave-body 1020 may continuously send the sensed vibration/movement data, and button-status data, to the master-body 1010 through wireless communication. Many applications may be supported with such a configuration. For example:

(1) panic-alarm application, e.g. for elderly people or disabled or other compromised persons requiring assistance for urgent help by pressing a button on the slave-body 1020, and then the master-body 1010 may send security-alert to pre-defined personnel through the MCD 1000, SMS, mobile phone, etc.;

(2) call-for-service application, e.g. call for person/staff to come and provide service;

(3) no-movement-alert application, e.g. to protect the elderly, disabled or other compromised persons if an accident happens. If the master-body 1010 senses that the slave-body 1020 (which is carried/held by, or attached to, a user 10 who has no normal movement (e.g. breathing movement, heart movement, or other biological indicators), for a pre-defined period of time, the master-body 1010 may send a security-alert to pre-defined personnel through the MCD 1000, SMS, mobile phone, etc.; and (4) login application, e.g. the user 10 may hold the slave-body 1020 and perform a series of movements and a movement code may be generated in terms of amplitude, frequency, relative movements, or other movement quantifiers. Afterwards once a movement's code matches the registered movement code, the master body 1010 may pass this movement code to a relative hardware device and/or software application, e.g. PC/web site, etc, and the hardware device and/or software application may recognize the code as a valid login information and admit the login automatically.

All the aforesaid features may work as stand alone features and/or products and may operate normally and independently when the MCD 1000 is out of the coverage area of sensor network 800 (or is offline mode). And, it can be appreciated that a pattern recognition system may replace the vibration sensor to detect the movement of the user 10 so that the user 10 may be automatically logged into a hardware device and/or software application without carrying or holding the MCD 1000 or slave-body 1020.

The MCD 1000 may comprise a communication port, e.g. USB port, to connect with internet. While online, the MCD 1000 may connect to the communication portal 1001 for data upload, such as transaction data, step data, vibration sensor data, etc., for selected data download, such as instant-information, ready-alert, security, daily-alert, service-request etc; for software upgrade; for battery charging; and for serving as a fixed sensor node 500, as a few non-exhaustive examples.

The MCD 1000 may serve as a wireless access control key to open a door, an entrance, or a turnstile at a specified time, date and period of enabled facilities, in paid/free area, such as estate, club house, club, hotel, resort, etc. The access right of the MCD 1000 may be configured by an administrator through the communication portal 1001, and the system for access right control may connect to a Customer Relationship Management (CRM) system for providing better service to the user 10.

The MCD 1000 may serve as an e-ticket or an electronic payment device to facilities, such as a club house, a club, a hotel, a resort, a disco, a cinema, a park, transportations, a vending machine, etc. The access right of the MCD 1000 may be configured by an administrator through the communication portal 1001.

The MCD 1000 may serve as a redemption mechanism for tender such as e-coupons, e-cash coupons, e-package coupons, and the like. The redemption may be for services at specified times, dates, or periods. The e-coupon rights of the MCD 1000 may be configured by an administrator through the communication portal 1001.

The MCD 1000 may serve as a membership card, a personal record card, or a medical card in order to reduce the number of cards personnel has to carry when he/she goes out.

The MCD 1000 may allow the user 10 to reply to simple questions, e.g., after receiving the ready-alert from restaurants, the user 10 may select acceptance or rejection about a choice by simply selecting "y" or "n". Furthermore, the MCD 1000 may enable the user 10 to answer simple multiple choice questions, e.g., surveys.

The MCD 1000 may communicate with the home TV set-top box and treat the home TV set-top box as a fixed sensor node 500.

The MCD 1000 may have an unlocking feature, e.g., the user 10 may hold the MCD 1000 and perform a series of movements and a movement code may be generated in terms of amplitude, frequency, relative movements, etc. If the movement code matches the registered movement code of a switch or a lock, the switch or lock may recognize the code as valid unlocking information and the switch or lock may be unlocked automatically at a specified time, date and period. Also the user 10 may unlock the switch or lock by pressing a button on the MCD 1000. If the MCD 1000's ID number matches the registered and/or required ID code of the switch or lock, the switch/lock may be unlocked automatically at specified time, date and period. In order to enable the switch or lock to accept the ID number, only a simple and inexpensive hardware circuit needs to be installed into the switch or lock. The right to unlock and provide access by the MCD 1000 may be configured by an administrator through the communication portal 1001. It should be understood that all the above features may work as a stand alone feature/product and operate normally and independently when it is out of the coverage area of sensor network 800 (or in offline mode).

The MCD 1000 may support many group applications. For example, (1) group communication, e.g. in a journey, the guide may broadcast a message, such as change of gathering location or time, etc., or calling all particular members of the tour group back, or informative communications as such. Also the guide may receive replies from the members; (2) group matching, e.g., a group of students or persons wanting to pair up randomly, they may put all the slave-bodies 1020 together and everyone just keeps the master-body 1010, then everyone may draw/select a slave-body 1020 randomly. Afterwards, everyone may press the button on the slave-bodies 1020 and the corresponding master-body 1010 may light up and/or vibrate to match with the slave-body 1020 and thus the pair-up task may be completed easily; (3) group voting, e.g. during a concert, TV show at home, disco, seminar, or class, etc., the host may collect a survey or voting data to determine the final song the audiences required, the last episode TV show ending selection, or the examination date, and the host may just ask the related audiences to answer some simple questions so that the host may make decisions according to the results; (4) group arrival status, e.g. a student/person may view on the display to find if the registered users 10 have arrived at the specified location, e.g. classroom, cinema, etc.; and (5) other kinds of group operations depending on applications. The above features (2)-(5) may work as a stand alone features and/or products and operate normally and independently when it is out of the coverage area of the sensor network 800 (or in offline mode).

Simplified versions of the MCD 1000, e.g. small display size, small device size, without slave-body, etc. may be implemented to collect the user's 10 instant score on provided food/services for statistical purpose. For example, a simplified version of MCD 1000, e.g. a tag with small display and input keys, may be attached with each item of food/dish. After having food/dish, the user 10 may express his/her enjoyment level about the food/dish and give marks by pressing the input keys, and the data may be automatically collected by the fixed sensor node 500 and be used internally, e.g. used by shop owner or administration staff for performance review, or be used exteriorly, e.g. published through the communication portal 1001 for sharing or recommendation, etc.

The sensor node 500, indoor and/or outdoor, is a wireless device which is installed and fixed at a location where the location owner/operator selects, and the major purpose of it is to communicate with the MCD's 1000, other sensor nodes 500, the Mobile Wireless Sensor node Input Devices 400, Mobile Kiosks 300, Mobile Displays 200, Mobile Administration Devices 100 and Backend Server 700 to send the instant-information to MCD 1000 users 10. A vibration sensor is embedded in circuitry of the sensor node 500 in order to avoid any crash, damage, unauthorized relocation or un-installation after initial installation.

The Mobile Wireless Sensor node Input Device 400 is a wireless device which enables the data entry personnel to input specified Instant-information, Ready-alert, Security-alert, Daily-alert and Service-request to the Universal Mobile Communication System. The inputted Instant-information, Ready-alert, Security-alert, Daily-alert and Service-request will then be distributed to specified MCD 1000, mobile phone, Backend Server 700 and other related devices of the Universal Mobile Communication System 1150.

The Mobile Wireless Sensor Node Input Device 400 may connect, or be operatively coupled to other types of sensor networks 800 to collect required data, e.g. environmental data, etc., so as to provide a user 10 his/her desired, required, or preferred environment to enjoy, such as, the food/services for specified event at specified date/time. Furthermore, the environmental data may include noise level, humidity, temperature, air circulation, brightness, or other environmental factors. With the addition of other inputted data, e.g. table density, furniture density, maximum customer number, type of customers, average expenses per head, style, etc, the Universal Mobile Communication System 1150 may recommend a place/service which is most suitable for the user 10, and the recommendation may be sent to the user 10 through a MCD 1000, a communication portal 1001, or a mobile phone, etc.

The Mobile Wireless Sensor Node Input Device 400 may connect with other types of sensor networks 800 to collect other required data at a place of different time/date for statistical purposes, the data may be noise level, noise level, humidity, temperature, air circulation, etc. Also, the place may be restaurant, bus, train, or other place of service.

The Mobile Wireless Sensor node Input Device 400 may connect with a RFID reader/system to read the information on a RFID device such as tag shape label, ticket, card, glass bead, or button for both general applications, such as asset management or inventory management and more service related operations, e.g., (1) to attach or put a RFID glass bead into red wine, white wine and other kind of wine to monitor any remaining wine by the user 10; (2) to attach or put a RFID glass bead into red wine, white wine and other kind of wine to determine the wine is fake or not by comparing the RFID with the ID number the supplier/producer provides.

The Mobile Wireless Sensor Node Input Device 400 may connect with other systems such as security system, access control system, or Customer Relationship Management (CRM) system to provide more comprehensive, better service and/or performance for the users 10.

A vibration sensor is embedded in the Mobile Wireless Sensor Node Input Device 400 circuitry to avoid any system crashes, damage, unauthorized relocation and/or un-installation after initial installation thereof.

The Mobile Kiosk 300 is a wireless mobile/fixed device which is placed at a location to facilitate the user 10 in managing and configuring the MCD 1000 through a user-friendly graphical interface environment.

The Mobile Kiosk 300 may enable the user 10 to download, input, select, configure, setup and register Instant-information, Ready-alert, Security-alert, Daily-alert, Service-request and specified data to/from the Universal Mobile Communication System 1150.

The Mobile Kiosk 300 may allow the user 10 to upgrade the MCD 1000's software.

The Mobile Kiosk 300 may allow other interested parties to connect other kind of equipments to act as a data input source to the Universal Mobile Communication System 1150. For example, equipments can be attached to the Mobile Kiosk 300 to measure the heart pulse rate, height and weight of the user 10 and then store the data in the corresponding MCD 1000.

The Mobile Kiosk 300 may enable the display of advertisement content and filtered user 10's content and other selected content. A vibration sensor is embedded in the circuitry of the Mobile Kiosk 300 to avoid any crashes, damage, unauthorized relocation/un-installation after initial installation.

The Mobile Display 200 is a wireless mobile/fixed device which is placed at a location to facilitate the MCD 1000 users 10 to view data There are three kinds of Mobile Display 200, (1) simple LED and symbol display for simple information, e.g. numbers, direction display, (2) LED wall and (3) LCD monitor for user 10 friendly Instant-information, Ready-alert, Security-alert, Daily-alert, Service-request and specified data display.

The Mobile Display 200 may enable the display of advertisement content and filtered user 10's content and other selected content.

A vibration sensor is embedded in the circuitry of the Mobile Display 200 circuitry to avoid any crashes, damage, unauthorized relocation/un-installation after initial installation.

The Mobile Administration Device 100 is a wireless mobile device which contains display and input keys to facilitate administration work and patrolling.

The Mobile Administration Device 100 may be carried by a landlord/tenant administrative personnel/receptionist during performing administration work/patrolling at indoor and outdoor area within/outside the coverage area of the sensor network 800.

The sensor network 800 signal level and battery level information may be shown on the display of the Mobile Administration Device 100.

The Mobile Administration Device 100 may provide an interface for the landlord/tenant administrative personnel/receptionist to record the abnormalities, e.g. car/shop door is open unexpectedly, car/shop lamp is light unexpectedly, car/shop is damaged, car is parked at unauthorized lot, etc. And then the recorded data may enter into the Universal Mobile Communication System 1150 automatically. If a pre-defined alerting case occurs, the Universal Mobile Communication System 1150 may then notify a pre-defined personnel and trigger a pre-defined alert, e.g. send Security-alert to the user 10 and the corresponding phone number for seeking more personnel to support, etc.

The Mobile Administration Device 100 may serve as a panic alarm for the user 10. If a panic alarm is received, the Universal Mobile Communication System 1150 may notify a pre-defined person and trigger a pre-defined alert, e.g. send Security-alert to the user 10 and the corresponding phone number for seeking more personnel to support, etc.

The Mobile Administration Device 100 may also integrate with other wireless sensor networks 800 to serve as a sensors output results display, follow up action status input and other sensor network 800 data input and output device.

The Mobile Administration Device 100 may be embedded with a vibration sensor so that if the user 10 has no movement for a certain period of time; the Mobile Administration Device 100 will send a "no movement" alert to the control center to notify this case and seek for follow-up support.

The Backend Server 700 is the core of the Universal Mobile Communication System 1150. It comprises control modules for the sensor network 800, system management/business logic, users' 10 registration information such as identity number, mobile phone number, email address, core Mobile Communication servers, database servers and backup servers.

The Backend Server 700 may communicate with all devices such as MCDs 1000, Fixed Wireless Sensor nodes 500, Mobile Wireless Sensor Node Input Devices 400, Mobile Kiosks 300, Mobile Displays 200, Mobile Administration Devices 100 and Short messaging service (SMS) servers 600 directly.

Under normal conditions, the Backend Server 700 may perform device checks, devices battery power level monitoring and data synchronizing. Once an abnormal case occurs, the Backend Server 700 may provide pop up alerts to the control center for follow-up action and send appropriate Security-alert to pre-defined personnel or Mobile Displays 200. If the Backend Server 700 is out of order, the devices under this Universal Mobile Communication System 1150 can still work normally, individually and independently.

The Backend Server 700 may enable data analysis such as customer relation management analysis, trend analysis and other kind of analysis required. For example, the Backend Server 700 may provide scheduling and discount calculating service (the discounting calculating rules are provided by corresponding food shop, service providers, etc.) in order to maximize the usage of food shop, service providers, etc., during peak hour/season and non-peak hour/season. Furthermore, then the Backend Server 700 may notify the selected users 10 about the information such as place, discount, duration, and conditions through the MCD 1000, Communication portal 1001, mobile phone, etc. The Backend Server 700 may connect with other systems such as security system, access control system, or CRM system to provide more comprehensive/better service/performance to the users 10.

The Backend Server may connect with a human goal achievement system to analyze the user 10's data such as data stored in the MCD 1000 and transaction data and personal data and facilitate the user 10 in achieving the desired goal and/or upgrade him/herself with regard to the specified goal. In this instance, there may be multiple users. In one example, if a clerk would like to become an accountant, the Backend Server 700 may advise this user 10 on how to achieve the goal from his current position in terms of various items, e.g. education, human network improvement, time management, financial plan, schedule, etc., and then reserve necessary service, place, etc. to facilitate the goal achievement. If the user 10 follows the advices, the user 10 would have a high probability to achieve the goal. In another example, if a user 10 would like to have a very romantic dinner with his girlfriend, the Backend Server 700 would advise the user 10 on how to achieve this object in terms of location selection, time management, and financial, and then reserve necessary service, place, etc to facilitate the goal achievement. If the user 10 follows the advices, the user 10 would have a high probability to achieve in the event. Aforesaid advices may be sent to the user 10 through the Communication portal 1001 and suitable alert(s) will also be given to the user 10 through the MCD 1000 or via registered phone numbers to provide reminders of important events needed to be done. A vibration sensor may be embedded in the Backend Server circuitry to avoid any system crashes, damage, and unauthorized relocation/un-installation after initial installation.

The SMS server 600 is mobile phone short message sending device which is operatively coupled with and controlled by the backend server directly. The SMS server 600 may send Instant-information, Ready-alert, Security-alert, Daily-alert, Service-request to a mobile phone while the user 10 is out of the coverage area of the sensor network 800. The SMS server 600 may send standard or ad-hoc messages to designated MCD 1000 user 10 or non-MCD 1000 user 10 upon Backend Server's request. A vibration sensor may be embedded in the circuitry of the SMS server 600 circuitry to avoid any system crashes, damage, and unauthorized relocation/un-installation after initial installation.

The communication portal 1001 is a web application which enables the users 10 to communicate with other MCD 1000 users 10, as well as non-MCD 1000 users. The Communication portal 1001 may enable the MCD 1000 user 10s to register personal information, perform software upgrade, view authorized Friend Information, manage/configure/customize the MCD 1000 to meet the user's 10 demand, e.g. select the type of Instant-information, Ready-alert, Security-alert & Daily-alert to be received and Service-request to be made, etc., on a convenient web environment.

The communication portal 1001 may enable the MCD 1000 users 10 to download vibration sensor's data, as well as pedometer's data, and then produce personal movement daily, weekly, monthly, quarterly, and/or yearly reports for health checking purpose. Furthermore, the communication portal 1001 may compare your overall heat dissipation and the food you have taken during a particular period, the food list can be downloaded from the MCD 1000 or input/selected by the user 10 through the communication portal 1001, may recommend the exercise package(s) the user 10 need to do to keep fit or lose weight.

The communication portal 1001 may enable interested parties such as company and organization to share part of the database so that the communication portal 1001 may make use of this shared data, and then provide Daily-alerts to the users 10 who have selected the Daily-alert service. For example, if an electricity company shares the bill date with the communication portal 1001 through an Application Programming Interface (API), the MCD 1000 user 10 which has an account in the electricity company can register the bill data as Daily-alert in the communication portal 1001. And, after the simple registration, Daily-alerts (or other periodic alerts) may be sent to the user 10 at or around the bill's due date. However, other pertinent information may be shared and delivered by the company at the choice of the company or customer for alerts particular notification events.

The communication portal 1001 may enable an administrator to control the access right of the MCD 1000 users 10 with the specified door, entrance, turnstile at specified times, dates and periods. Moreover, the communication portal 1001 may enable an administrator to control the access right of the MCD 1000 users 10 to unlock corresponding switch, lock, etc. at specified time, date and period.

The communication portal 1001 may enable an administrator to control the access right of the MCD 1000 users 10 with the e-ticket and e-coupon. The communication portal 1001 may enable a poll about particular food/service and the result of the poll may serve as a recommendation to the users 10. The communication portal 1001 may enable the users 10 to set personal schedule or join in other authorized parties' schedule so that the MCD 1000 may remind with one kind of Ready-alert the user 10 for the specified events, e.g. event start time, stop time, etc.

So, when the MCD 1000 is operatively coupled to the communication portal 1001, the communication portal 1001 may provide and show the user 10 with specified Instant-information, Ready-alert, Security-alert, Daily-alert and Service-request, etc on the MCD 1000's display to enable the user 10 to know what is happening outside of concern to the user 10. Various types of the users 10 in the present Universal Mobile Communication System 1150, according to the type of Instant-information, Ready-alert, Security-alert, Daily-alert and Service-request, may be categorized as: primary school student, secondary school, university students, parents, elderly persons. Each user type may be assigned with certain type of Instant-information, Ready-alert, Security-alert, Daily-alert and Service-request initially and the type of a user 10 can be configured through the Communication portal 1001.

The type of exemplary Instant-information in the present Universal Mobile Communication System 1150, may be divided into two categories: auto-provided data and user-activated data. The auto-provided data may be automatically downloaded to the MCD 1000 in according to the location that the user 10 situates.

For example:

Queue information with queue speed about facilities which require booking of locations which have waiting lines, e.g. restaurants, shops, washrooms, cinemas, salons, supermarkets, car parking lots, flights, ATMs, banks, parks, libraries, fitting rooms, bars, museums, swimming pools, government establishments, club houses, etc.

Transportation schedule information, e.g. bus, train, mini bus, taxi, peak tram, light train and other kind of transportation facilities.

Particular information, e.g. exchange rate, weather, announcements, warnings and other information required at a particular location.

The user-activated data may be downloaded to the MCD 1000 immediately upon the users 10 request by pressing the input keys on the MCD 1000.

Queue ticket information which is not configured as auto provided data and with remote service reservation feature and service available Ready-alert feature, e.g. for a restaurant, salon, pharmacy, fitting room, and other service providers which require issuing tickets for queuing up.

Location Guiding Information, e.g. the displacement and direction of transportation location, car park cashier location, street locations, exit locations, required product location such as in supermarket and other kinds of Location Information that the MCD 1000 users 10 would like to know.

Service discount information, e.g. shop discount, peak hour/season discount, non-peak hour/season discount and all other kinds of promotions and discounts that are provided by the service provider.

Advertisement data/discount download, e.g. download the advertisement data/discount directly from the Sensor node 500 installed at indoor/outdoor advertisement board/wall, home TV set-top box and other kinds of advertisement devices.

Transaction information, e.g. records for purchasing transaction amount or details, car parked location, car parked duration and all other kinds of transaction data.

Stamp collection information, e.g. sticker/bonus collection scheme of a shop and all other schemes which require collecting sticker or some other items after purchasing or having a service.

Friend existing information, e.g. restaurant, shop, washroom, cinema, salon, supermarket, car park, flight, ATM, bank, park, library, fitting room, bar, museum, library and all publicly and personally accessed locations.

Targeted location and/or guiding information, e.g. parking lot location, shop location, friend location and other destination locations which are selected on the MCD 1000 by the user 10.

Transportation journey's estimated duration, e.g. bus, train, mini bus, taxi, peak tram, light train, and other kinds of transportation facilities.

Current vehicles' entry time, exit time, parked time duration and parking lot registration and other car park parking information.

Restaurant and/or service provider information.

Multiple-player game availability information with remote join in and award notification feature.

Lottery information with remote join in and award notification feature.

Recommendation information, e.g. food, products etc recommendation voted through the communication portal 1001.

Available services and facilities information, e.g. beaches, resorts, hotels, universities, supermarkets, airport, and other locations that provides services and facilities.

Other instant-information that is not initially configured as auto provided data in the MCD 1000.

The types of exemplary Ready-alert in the present Universal Mobile Communication System 1150 are as follows.

Restaurant table available;

Location and arrival of a particular destination, e.g. bus station, tram station, train station, street, or exits in specified zones such as in supermarket, to avoid missing the destination.

For the specified zone's Location arrival Ready-alert feature, a user 10 may input the shopping list into the MCD 1000 through the communication portal 1001, the Mobile Kiosk 300, or the service counter in advance, and then when the user 10 is in a zone that the required product exists, a Location arrival Ready-alert may be sent to the related MCD 1000 for alerting the user 10;

Salon service available;

Fitting room available;

Laundry service available/completed;

Food for take away ready;

Food (inside food shop) ready;

Doctor consultation service available;

Specified transportation such as flight and ship ready to make sending and collecting person in a more time controlled way;

Specified friend exiting;

Specified shop open or closing;

Specified event such as start time and stop/close time;

Communication portal 1001/MCD 1000 new feature(s), e.g. MCD 1000 software upgrade/update; and Selected Instant-information described above and all other services which requires the customer to return when the service is available.

The types of Security-alert in the present Universal Mobile Communication System 1150 are as follows.

Anti-property-theft;

Anti-car-theft;

Vehicle abnormal;

No movement, e.g., no normal movement for a certain period of time, etc;

Panic alarm, e.g. your friend has pressed panic alarm at home, etc;

Lost and found for items, children, persons, pets, etc;

Protected area, e.g. unauthorized turning on/off of an appliance or equipment, unauthorized entering, etc.

Registered MCD 1000 users 10 out of monitoring range, therefore, after two MCD 1000s are registered, if the distance between these two Devices is out of a specified range, an out of monitoring range alert will be issued, and this service can be activated through the communication portal 1001 or connecting two Devices by pressing the input keys at the same time;

Medicine Allergy, e.g. when collecting medicine after doctor's advice, the user 10 may just press the input key(s) on the MCD 1000 and check if the medicine collected is on the medicine allergy list or not. If it is yes, a medicine allergy Security-alert may be sent to the user 10 to alert the case and the name of the violated medicine will be shown on the display of MCD 1000.

As discussed above, the interested parties may share part of their database to the communication portal 1001 and then the communication portal 1001 may process the data and produce a new Daily-alert to related MCD 1000 users 10, and the Daily-alert may be configured or enabled by the user 10 through the communication portal 1001. The types of Daily-alert in the present Universal Mobile Communication System 1150 follows below.

Personal alerts such as bill's due date, e.g. electricity bill, water bill, telephone bill, estate management fee, school fees bill, gas bill, tax bill, credit card bill, paid TV bill, internet service bill, installment bill, mortgage bill, loan repayment bill, annual fee bill, car license fee bill, government fee bill, overdue library book, and any other issues with due dates;

Form submission/application deadline Daily-alert, e.g. tax form, school and/or university application, summer course application and all other submissions and/or applications with deadlines.

Ready for application/purchasing Daily-alert, e.g. cinema movie tickets, sport facilities, hotel, requested training course, government, clubhouse, etc;

Warranty expiry Daily-alert, e.g. air conditioner, television, refrigeration, Hi-Fi and all other appliances or machines or equipments that have warranty expiry date;

License expiry Daily-alert, e.g. company registration license, car license, driver license, pet license, fishing license, membership, etc;

Time's up Daily-alert, e.g. car rental, bicycle rental, room rental, badminton/tennis court rental, football field rental, table tennis table, book(s) borrowed from library, and other things borrowed/rented from some places/people;

Coupon expiry Daily-alert, e.g. restaurant coupon, food coupon, service coupon, cash coupon, discount coupon and all others coupons that have coupon expiry date;

Announcement Daily-alert, e.g. suspension of fresh water supply, suspension of flush supply, suspension of electricity supply, suspension of lift service, suspension of club house services, etc;

Product bidding result Daily-alert, e.g. eBay bidding. The alert may include successful bid/failed bid, bid price, bid remarks, etc;

Web purchasing status Daily-alerts, for example Amazon (or other online marketers) purchasing/delivery status. The alert may include shipping status, delay or early arrival notification, special discount, etc.;

Special date Daily-alert, e.g., relatives/friends birthdays, wedding anniversaries, etc;

Investment Daily-alert, e.g., stop profit reached, stop loss reached, target price/interest rate reached, time deposit maturity, and/or other types of financial investment alerts;

Task Daily-alert, e.g., flower watering, regular physical exercise, grass cutting, snow clearing, air-conditioner dust filter cleaning, air-conditioner annual maintenance, car annual maintenance, and other tasks alerts;

Movement habit/voice pattern Daily-alerts;

Medical Daily-alerts, such as subsequent doctor consultation dates, health check date, injection time/date, complaint handling status, medicinal product new arrival alerts, and the like.

Personal, Tenant, Management office, Landlord and Other User Alerts:

Contract expiry Daily-alerts, such as fresh water pump contract, flush water pump contract, lift maintenance contract, estate management service contract and all other technical and non-technical contracts that have expiry date;

Monitoring Signal Daily-alerts, e.g. fresh water tank low level, flush water tank low level, fire service water tank low level, lift panic alarm, system failure, intruders, machine fuel low level, important battery low level and other type of monitoring signals;

Client request for Property Agency or Insurance Agency service Daily-alerts;

Arrival Daily-alerts, e.g., specified/required person, vehicle, or delivery notification to a specified location;

VIP Daily-alerts, e.g., boutiques, hotels, restaurants, shops, etc., and other types of services requiring provisions of special services to their VIPs;

Inventory and/or Materials Daily-alerts, e.g., boutiques, restaurant and other types of business that need to keep track of their inventory/materials level in order to ensure that the supply to customer/client is sufficient;

Foods stuff and/or Materials expiry Daily-alerts, e.g., sea food, or materials with a limited shelf life;

Machine, equipment, or instrument failure and/or performance Daily-alerts, e.g., restaurant oven, restaurant stream oven, theater spot light and all other types of machines, equipment, or instruments in a service capacity that would affect the service level/performance to clients/customers.

Exemplary types of Service-request in the present Universal Mobile Communication System 1150 may be as follows:

Ticket or Reservation Service-requests, e.g., for restaurant, salon, pharmacy, fitting/changing room and other service providers which require issuing ticket for queue up. Once the ticket number is nearly ready, a Ready-alert will be sent to the corresponding MCD 1000 user 10;

Take away Service-requests, e.g., for fast food shops, coffee shops, etc. For example, when a MCD 1000 user 10 wants to buy a cup of coffee or fast food when traveling, the MCD 1000 user 10 could make an order on the MCD 1000. Upon coffee/food shop confirmation, an order number will be displayed on the MCD 1000. When the MCD 1000 user 10 arrives at the station, the coffee or food is ready to take away. The MCD 1000 user 10 could use the order number shown on the MCD 1000 to take away the ordered coffee/food. The payment could be made in present or electronically;

Staff Calling Service-request, the users 10 can use the MCDs 1000 to (1) call staff to come to his/her location to serve him/her and (2) serve as a panic alarm to ask for assistance if such service is available at the location;

All other services that could enable the MCD 1000 user 10 to make order or reservation in advance and then enjoy the service when the user 10 arrive later or at the specified time or date.

A better understanding of the present Universal Mobile Communication System 1150 will be obtained from the following detailed description about a car parking lot application.

1. Car Registration Operation

There are two kinds of Car Registration Operations: car park registration and the parking lot registration. It is to be understood that the term "car" may also include any type of vehicle that can be transited and stored in and outside of a parking lot scenario.

Figure 2:
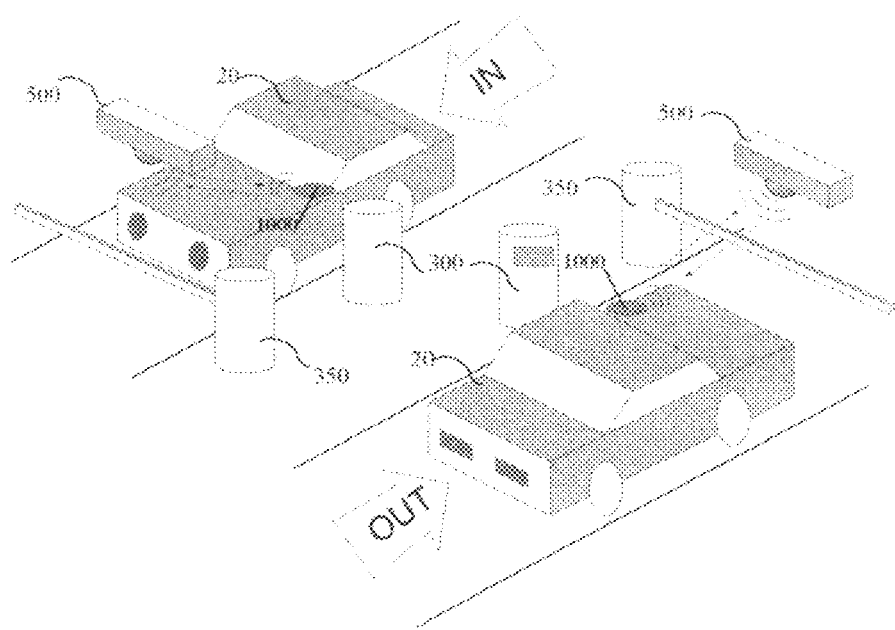
FIG. 2 illustrates an auto park registration in an application of the Universal Mobile Communication System, in accordance with an embodiment of the present invention.
Figure 3:
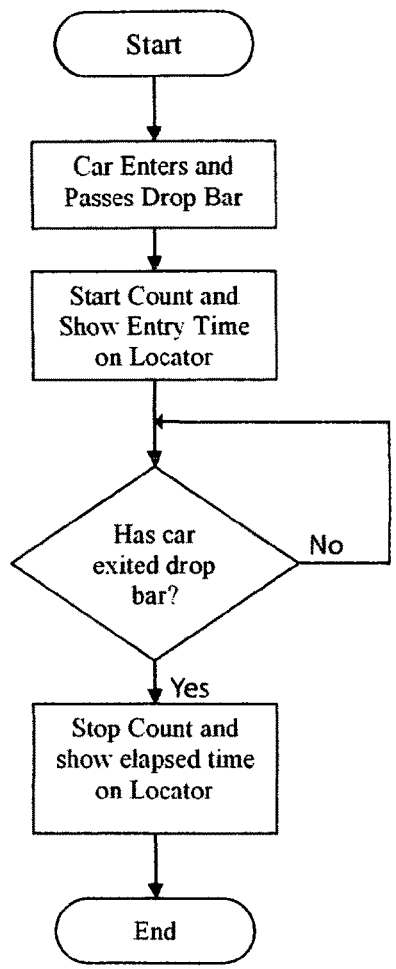
FIG. 3 is a flow diagram showing procedures associated with an auto park registration application of the Universal Mobile Communication System, in accordance with an embodiment of the present invention.

As shown in FIG. 2, during a car park registration, a car or vehicle 20 enters or exits a drop bar 350 of a car park. The car park is equipped with the Universal Mobile Communication System 1150, and a set of Sensor nodes 500 which may communicate and record the MCD 1000's identity number. The parking in-time and parking period may also be recorded and shown on the MCD 1000. An operation flow chart of this process is shown in FIG. 3.

Figure 4:
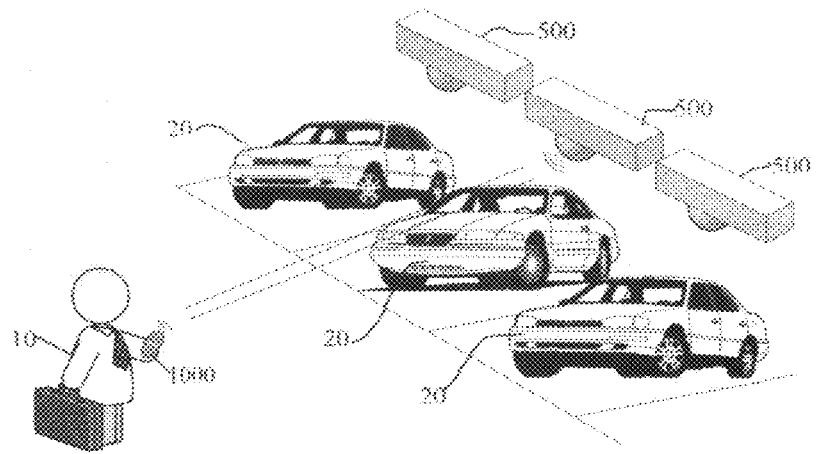
FIG. 4 is schematic diagram illustrating aspects associated with an auto park registration application of the Universal Mobile Communication System, in accordance with an embodiment of the present invention.
Figure 5:
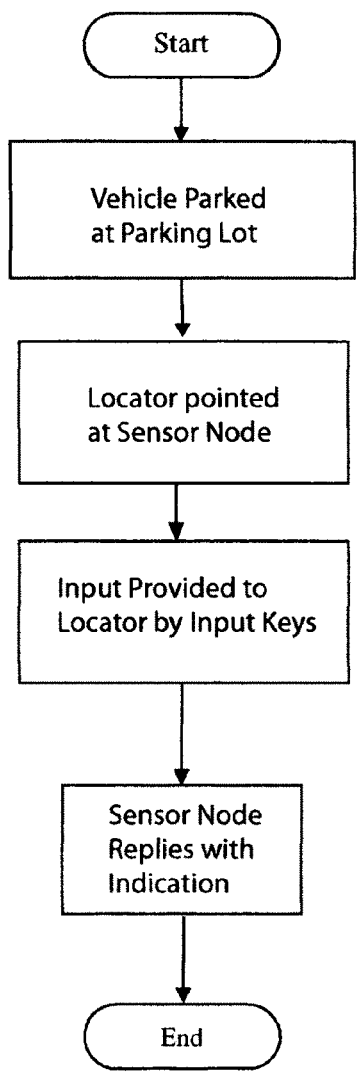
FIG. 5 is a flow diagram showing procedures associated with an auto park registration application of the Universal Mobile Communication System, in accordance with an embodiment of the present invention.

As illustrated in FIG. 4, parking lot registration may transpire after a driver or user 10 parks a car 20 in a parking lot. The driver or user 10 may register the car at that parking lot by pointing the MCD 1000 to the Sensor node 500 to facilitate communication transmissions to initiate registration in the parking. The registration is completed when the sensor node 500 replies with an indicator alert. The operation flow chart of this process is shown in FIG. 5.

2. Parking Lot Location Guiding Operation

Figure 6:
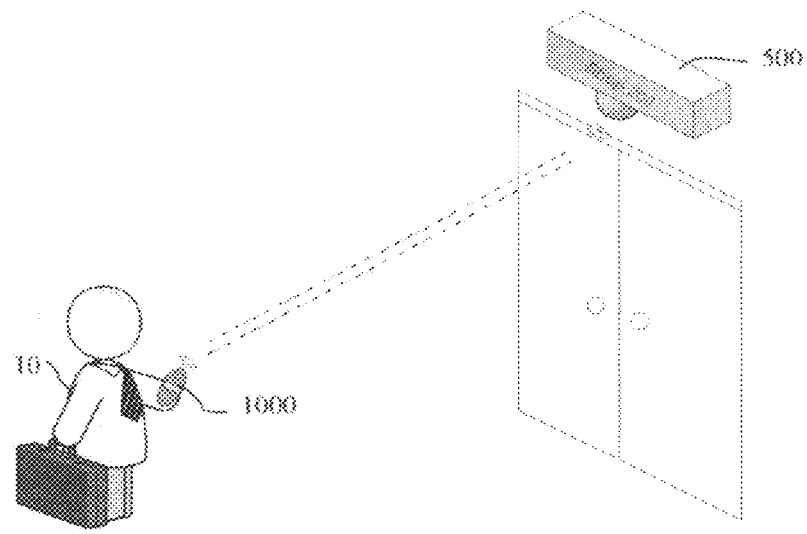
FIG. 6 is schematic diagram illustrating location procedure aspects associated with an auto park registration application of the Universal Mobile Communication System, in accordance with an embodiment of the present invention.
Figure 7:
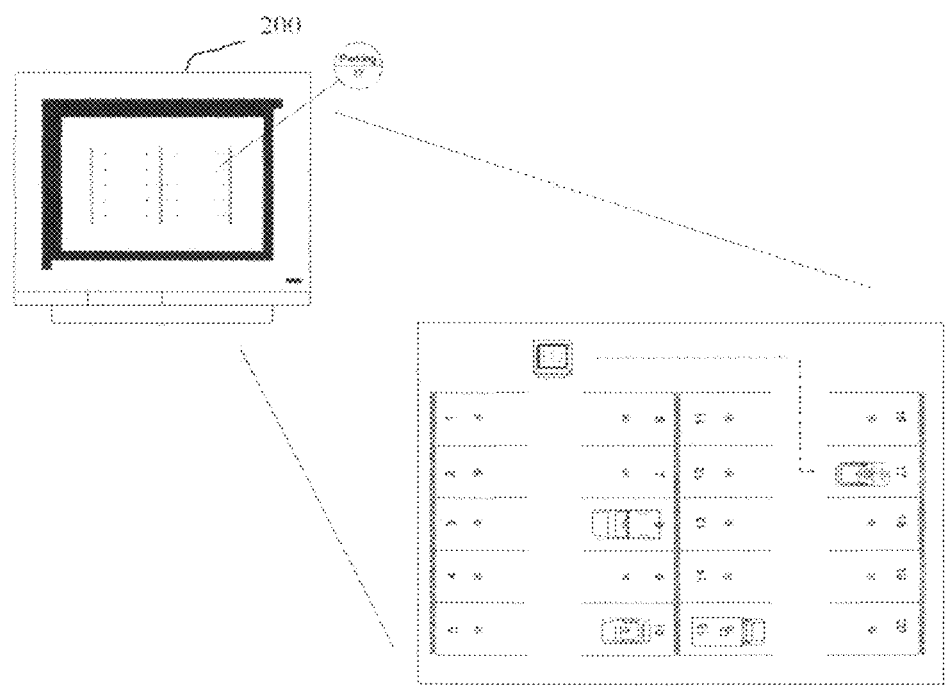
FIG. 7 is an illustration showing display functions of a Mobile Display 200 device associated with an auto park registration application of the Universal Mobile Communication System, in accordance with an embodiment of the present invention.
Figure 8:
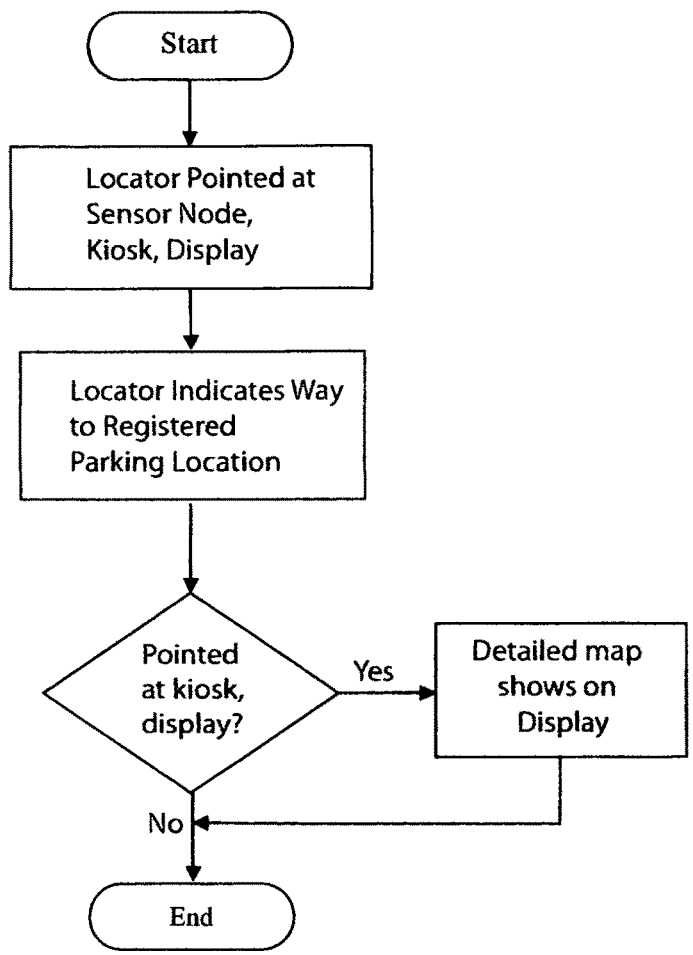
FIG. 8 is a flow diagram that illustrates a vehicle location finding procedure in accordance with an embodiment of the present invention.

When a driver who is in the car park or other places within the sensor network 800 coverage area wants to know the way to go back to the registered parking lot, the driver may simply point the MCD 1000 (which in this embodiment serves as a Locator) to any Sensor node 500 (FIG. 6), Mobile Kiosk 300, or Mobile Display 200 (FIG. 7) using input keys of the MCD 1000. The parking lot location such as direction and displacement may then be shown on the display 200 of the MCD 1000. In some embodiments, a detailed graphical map may also be shown on the display of the Mobile Kiosk 300 or the Mobile Display 200. The operation flow chart illustrating the process of locating a parked car/vehicle 20 is shown in FIG. 8.

3. Anti-Auto-Theft Operation

Figure 9:
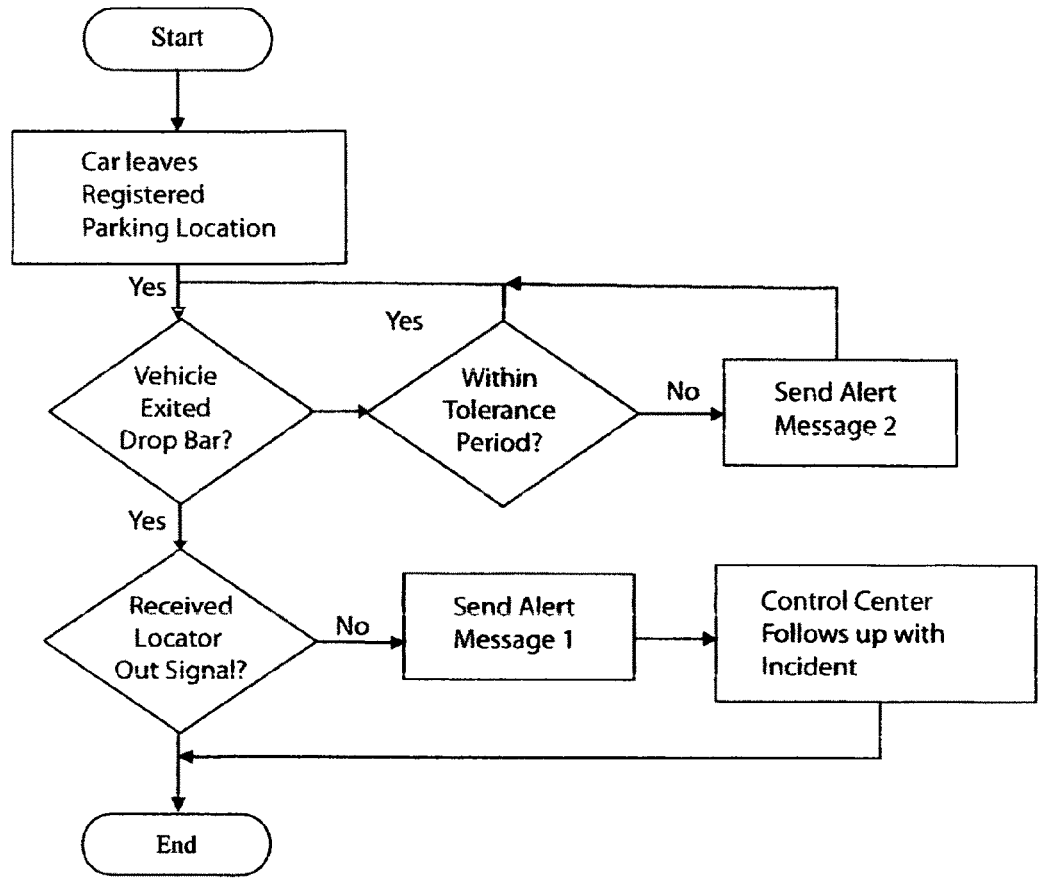
FIG. 9 is a flow diagram that illustrates an auto-anti-theft in accordance with an embodiment of the present invention.

A driver may select the anti-auto-theft mode on the Mobile Communicator Device 1000, for facilitating security features of the UMCS 1150. Under this operation modality, when the anti-auto-theft mode activated car 20 leaves its registered parking lot, the Backend Server 700 may monitor the car location status. If the car 20 exits the drop bar 350 without the associated MCD 1000 data, a Security-alert may be sent to the MCD 1000 and the MCD 1000 registered phone number to inform the user 10 of the situation. If the car 20 leaves its registered parking lot but not exits the drop bar 350 over a pre-defined tolerance, a Security-alert may also be sent to the MCD 1000 and the MCD 1000 registered phone number to inform the user 10 of the situation. The Anti-Car-Theft Operation flow chart of this process is shown in FIG. 9.

4. Shop Location Guiding Operation

Figure 10:
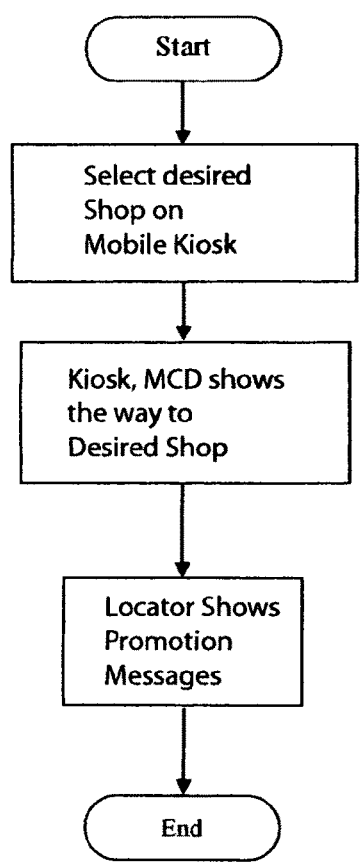
FIG. 10 is a flow diagram that illustrates a shop location guiding in accordance with an embodiment of the present invention.

When a person wants to know the way to go to a particular shop/location, he/she may select the desired shop/location on the Mobile Kiosk 300. The way to the desired shop/location will be shown on the display of the Mobile Kiosk 300. If the person has a MCD 1000, the guiding information would also be sent and shown on the MCD 1000. The operational flowchart of this process is shown in FIG. 10.

5. Security-Alert Operation

Figure 11:
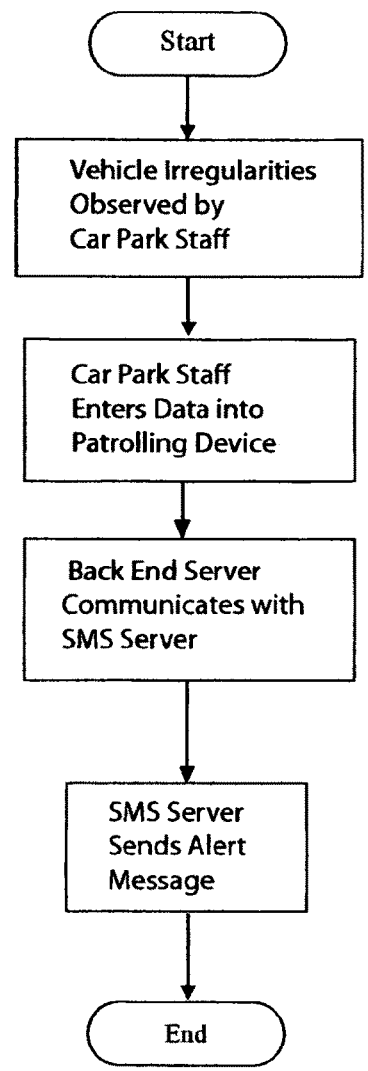
FIG. 11 is a flow diagram that illustrates an auto-anti-theft alerting procedure in accordance with an embodiment of the present invention.

When a landlord/tenant administrative personnel and/or receptionist during his/her work observes abnormal situations, he/she may immediately input the abnormalities through the hand-held Mobile Administration Device 100 and the Universal Mobile Communication System 1150 may then notify pre-defined persons and trigger pre-defined alerts. The operational flowchart of this process is shown in FIG. 11.

It should be understood that in order to enhance the network coverage area of the Universal Mobile Communication System 1150, to increase the MCD 1000's portability, and to facilitate the extendibility and flexibility of the Universal Mobile Communication System 1150 application developments, future developments of the Universal Mobile Communication System 1150 are suggested as follows.

1. Network Coverage Area Enhancement

Besides the original wireless and wire-line sensor network 800 coverage area, in order to enhance the coverage area of the Universal Mobile Communication System 1150 to facilitate launching more comprehensive applications, the following networks are suggested to be integrated into the Universal Mobile Communication System 1150:

Mobile phone networks, e.g., GSM network, PCS network, 3G network, 4G network, satellite network, etc., other communication networks, e.g., Octopus related networking, Near Field Communication related network, Wi-Fi network, wireless/wired LAN, walkie-talkie network, patrolling network, GPS network, RFID network, other sensor network 800, low-frequency communication network, other small-area and/or large-area covered networks.

2. MCD 1000's Portability Enhancement

Originally, the MCD 1000 is designed as a portable individual device. However, presently, many people carry numerous electronic devices such as mobile phones, portable gaming devices (e.g., PSP, Nintendo DS), music player (e.g. iPod), Notebook computer, and the like. The electronic carrying device burden of a person is already too heavy. Under this consideration, in order to improve the portability of the MCD 1000, i.e., to avoid the user 10 from carrying so many electronic devices at a time when he/she goes out, the following electronic devices are suggested to be embedded in the circuitry of the MCD 1000 so that at least the display and input keys of the following devices may be shared: Mobile phone, iPod/iPhone, Netbook, Portable Wireless broadband devices, Walkie-talkie, Patrolling devices, GPS devices, Electronic payment related devices (e.g. Near field communication related devices, Octopus related devices, etc), RFID-related devices, Other sensor network 800 related devices, Memory sticks, voice recording devices, portable game devices and Other portable network devices.

3 Application Developments Extension

The application development extension in the Universal Mobile Communication System 1150 is simple. By taking advantage of the Communication portal 1001 released software (e.g. released API, etc.) and released standardized hardware (e.g. fixed wireless/wire-line sensor node 500 and Mobile Wireless Sensor Node Input Device 400), an interested party may develop its own application by simple software configurations and hardware registrations. This arrangement may highly improve and encourage different parties to join in the Universal Mobile Communication System 1150 development. In such a way, the Universal Mobile Communication System 1150 applications may become more comprehensive, the Communication portal 1001 may have higher accessing rate and the Universal Mobile Communication System 1150 related hardware may have higher utilization.

While specific embodiments of this invention have been described in detail, it will be appreciated by those skilled in the art that various modifications and alternatives to those details could be developed in light of the overall teachings of the disclosure. Accordingly, the particular arrangement disclosed in meant to be illustrative and not limiting as to the scope of the invention which is to be given the full breadth of the appended claims and any equivalents thereof.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used and/or to the particular embodiment disclosed as the best mode contemplated for carrying out this invention, but that the invention will include any and all embodiments and equivalents falling within the scope of the instant disclosure.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

What is claimed is:

1. A method for automobile park registration comprising:
providing a universal mobile communication system comprising
a mobile communication device;
a fixed sensor node;
a backend server;
a short messaging system server; and
a communication portal;
said mobile communication device wirelessly, operatively coupling said fixed sensor node, said backend server, said short messaging system server, and said communication portal and thereby providing communication transmissions there between;
a mobile kiosk operatively coupled to said mobile communication device, said fixed sensor node and said backend server; and
a mobile display device operatively coupled to said mobile communication device, said fixed sensor node and said backend server;
a mobile administration device operatively coupled with said fixed sensor node, said backend server; and
a mobile wireless sensor node input device which in operatively coupled to said mobile communication device, said fixed sensor node and said backend server; and
said mobile communication device comprises at least one set of a master-body and a slave-body operatively coupled to one another through wireless communication for facilitating wireless communication within said system; and wherein said fixed sensor node is located in a parking lot, said fixed sensor node communicating with and registering said mobile communication device located in an automobile upon entrance into said parking lot, establishing an anti-auto theft mode of said system with input keys of said mobile communication device, and thereby establishing communication there between;

monitoring a condition and location associated with said ant-auto theft mode of the mobile communication device of the automobile;

said fixed sensor node providing an alert signal to said backend server of the theft condition and location of said mobile communication device of the automobile.

2. The method for automobile park registration of claim 1 wherein
said backend server communicates alert signals wireless to said mobile communication device via said sensor node when in wireless coverage area.

3. The method for automobile park registration of claim 2 wherein
said backend communicates alert signals via said short messaging system server to a mobile phone number associated with said mobile communication device.

* * * * *